US011082866B2

(12) United States Patent
Kim et al.

(10) Patent No.: US 11,082,866 B2
(45) Date of Patent: Aug. 3, 2021

(54) APPARATUS AND METHOD FOR DIAGNOSING ABNORMALITY OF MOBILE COMMUNICATION NETWORK USING OPERATIONAL LOGIC MODELING AND COMPARATIVE ANALYSIS

(71) Applicant: Korea Advanced Institute of Science and Technology, Daejeon (KR)

(72) Inventors: Yongdae Kim, Daejeon (KR); Sangwook Bae, Daejeon (KR); Mincheol Son, Daejeon (KR); Sooel Son, Daejeon (KR)

(73) Assignee: Korea Advanced Institute of Science and Technology, Yuseong-gu (KR)

( * ) Notice: Subject to any disclaimer, the term of this patent is extended or adjusted under 35 U.S.C. 154(b) by 0 days.

(21) Appl. No.: 16/726,066

(22) Filed: Dec. 23, 2019

(65) Prior Publication Data

US 2020/0213879 A1 Jul. 2, 2020

(30) Foreign Application Priority Data

Dec. 27, 2018 (KR) .................. 10-2018-0170196

(51) Int. Cl.
*H04W 24/04* (2009.01)
*H04W 16/22* (2009.01)

(52) U.S. Cl.
CPC ........... *H04W 24/04* (2013.01); *H04W 16/22* (2013.01)

(58) Field of Classification Search
CPC .............................. H04W 24/04; H04W 16/22
USPC ......................................................... 455/423
See application file for complete search history.

(56) References Cited

U.S. PATENT DOCUMENTS 6,985,968 B1 * 1/2006 Gammenthaler, Jr. ...................... H04Q 3/0025 370/463
7,610,396 B2 * 10/2009 Taglienti ................. H04L 12/14 370/310
7,826,381 B1 * 11/2010 Kastuar ................... H04L 43/50 370/242

(Continued)

FOREIGN PATENT DOCUMENTS

KR    10-2018-0081959 A     7/2018

OTHER PUBLICATIONS

Tu, G.-H., et al., "Control-Plane Protocol Interactions in Cellular Networks," ACM SIGCOMM Computer Communication Review 44(4):223-234, 2014.

*Primary Examiner* — William Nealon
(74) *Attorney, Agent, or Firm* — Christensen O'Connor Johnson Kindness PLLC

(57) ABSTRACT

Disclosed are an apparatus and method for diagnosing an abnormality of a mobile communication network. The apparatus for diagnosing an abnormality of a mobile communication network includes a modeling unit that models a control plane operation of an analysis target mobile communication network based on a control plane messages collected by a preset Mobile Network Operator to a terminal in a formal model of a form of a state machine, an analysis unit that compares processing required times of a control plane operation model of the modeled analysis target mobile communication network and a control plane operation model of another mobile communication network previously generated in a same path, and a detection unit that detects an abnormal operation of the mobile communication network of the analysis target based on a comparison result.

17 Claims, 6 Drawing Sheets

(56) References Cited

U.S. PATENT DOCUMENTS

| | | | | |
|---|---|---|---|---|
| 2001/0032069 A1* | 10/2001 | Arweiler | ............... | H04L 43/18 |
| | | | | 703/27 |
| 2004/0078717 A1* | 4/2004 | Allred | ............... | H04L 63/0281 |
| | | | | 714/43 |
| 2007/0105544 A1* | 5/2007 | Veres | ............... | H04W 24/08 |
| | | | | 455/423 |
| 2010/0211675 A1* | 8/2010 | Ainali | ............... | H04L 43/0888 |
| | | | | 709/224 |
| 2015/0065121 A1* | 3/2015 | Gupta | ............... | H04W 28/04 |
| | | | | 455/424 |

* cited by examiner

APPARATUS AND METHOD FOR DIAGNOSING ABNORMALITY OF MOBILE COMMUNICATION NETWORK USING OPERATIONAL LOGIC MODELING AND COMPARATIVE ANALYSIS

CROSS-REFERENCE TO RELATED APPLICATION

A claim for priority under 35 U.S.C. § 119 is made to Korean Patent Application No. 10-2018-0170196, filed on Dec. 27, 2018, in the Korean Intellectual Property Office, the entire contents of which are hereby incorporated by reference.

BACKGROUND

Embodiments of the inventive concept described herein relate to an apparatus and method for diagnosing an abnormality of a mobile communication network, and more particularly, relate to an apparatus and method for diagnosing an abnormal operation of a mobile communication network using operation modeling and comparative analysis.

In a mobile communication network, because a control plane is one of the important factors affecting quality of experience (QoE) in an actual network, the performance analysis and evaluation of the control plane procedure is very important. Accordingly, the technology of detecting an abnormality occurring in the control plane procedure and analyzing the causes to optimize and manage the network is an essential technology for the mobile communication service provider. In addition, it is an important technology in operating the network by analyzing the effects on the installation and introduction of new core network equipment.

Conventionally, in order to grasp an abnormality occurring in the control plane of a mobile communication network, it compares the contents defined in the 3GPP standard with a control plane message transmitted and received between the terminal and the access network or the terminal and the core network. However, because the standard measure constituting each area (access/core network) of the mobile communication network is very large, so much effort is required for analysis. In addition, the 3GPP standard includes parts that are specified as options or ambiguous contents. For these parts, each communication provider and manufacturer defines them in a manner according to their own implementation guideline. Therefore, the network configurations and operation schemes are different depending on the operator who operates the mobile communication network and the manufacturer of the equipment constituting the network. This uniqueness of a mobile communication network makes it difficult to grasp the cause of the detected abnormal operation even if the related standard is analyzed. Therefore, there is a need to provide an apparatus and method for detecting an abnormality of a network and analyzing the cause at a precise and low time cost while considering the specificity of the operation of the mobile communication network.

As a conventional technique for solving this problem, a comparative analysis (Procedure-based analysis) scheme that detects an abnormal operation by comparing the time required for each control plane procedure with previous statistics in other Mobile Network Operators and the Mobile Network Operator has been used. However, the order and contents of the detailed procedures within the target control plane procedure to be compared and analyzed vary depending on the network configuration and the situation of the terminal. In other words, there are various operational scenarios performing the same control plane procedures. In the related art, despite these various scenarios, the abnormal operation is determined by comparing the total time required for a particular procedure while ignoring the various entailed operational scenarios. This results in deriving an incorrect analysis result and fails to detect an abnormal operation.

The result obtained by the comparative analysis method of the prior art causes the following problems.

First, an abnormal operation occurring in the process of processing the detailed procedure cannot be detected because the prior art skips to compare the time required for the detailed procedures. For example, even though the total time required for a specific control plane procedure and the order of detailed procedures are the same, when the control plane message is inspected in detail, the times required for processing each detailed control plane message are different.

Second, the comparison while ignoring a variety of operational scenarios in the control procedure derives an incorrect analysis result. As described above, there are a variety of operational scenarios according to the situation of the procedure and the internal operation is changed according to each scenario. As in the related art, this coarse-grained comparison is not an appropriate comparison to detect an abnormality existing inside the mobile communication network.

To summarize, extensive and detailed analysis of the collected control plane messages is required to specify the cause and situation of occurrence of the abnormal control plane procedures. In addition, after detecting abnormal operation in a mobile communication network, a technique for retrieving useful information to analyze the abnormal operation is further required.

SUMMARY

Embodiments of the inventive concept provide an apparatus and method for diagnosing an abnormality of a mobile communication network, which can detect an abnormal operation and diagnose a cause of an abnormality by modeling an operation scheme for each Mobile Network Operator (MNO) based on the control plane message collected from the terminal, and comparing and analyzing statistical values for each control plane procedure for the control plane operation process shared between the models.

According to an exemplary embodiment, an apparatus for diagnosing an abnormality of a mobile communication network includes a modeling unit that models a control plane operation of an analysis target mobile communication network based on a control plane messages collected by a preset Mobile Network Operator to a terminal in a formal model of a form of a state machine, an analysis unit that compares processing times of a control plane operation in the modeled analysis target mobile communication network with a control plane operation model of another mobile communication network, and a detection unit that detects an abnormal operation of the mobile communication network of the analysis target based on a comparison result.

The modeling unit may include a state definition modeling unit that models an interaction operation between multiple control plane protocols and the state machine, and transition definition modeling unit that models a transition which is a set of sequentially listing the control plane messages during the state change.

The state definition modeling unit may represent the states of the multiple control plane protocols as one state, and model an operation in which a plurality of protocols and the state machine interact with each other to provide an integrated view of the control plane operation.

The transition definition modeling unit may model the transition by sequentially listing the control plane messages transmitted and received until the state change in which a current state is changed to another state, and the transition may represent an operational scenario of the control plane procedure of the mobile communication network.

The analysis unit may include an extraction unit that extracts a path and a processing time of control plane messages existing in the path from the control plane operation model of the analysis target mobile communication network and the model of the other MNO's mobile communication network, and a comparison unit that compares the extracted processing required times in the same path extracted from the another control plane operation models of the analysis target mobile communication network.

The extraction unit may extract a path that is a set of transitions from a source state to a sink state in each of the control plane operation model of the analysis target mobile communication network and the control plane operation model of the another mobile communication network, and extract the processing required time of the control plane messages existing in the extracted path.

The comparison unit may compare the processing required times of the control plane messages, which are extracted by the control plane operation model of the analysis target mobile communication network and the control plane operation model of the another mobile communication network, in the same path representing a sequence and content of a same transition.

The detection unit may determine an interval of the control plane message of the analysis target mobile communication network as a long latency message interval (LMI) when the processing required time of the control plane operation model of the analysis target mobile communication network is greater than the processing required time of the control plane operation model of the another mobile communication network in the same path.

The detection unit may detect an occurrence condition of an abnormal operation for a network component that processes a control plane message in a corresponding path indicated by the same path, a path and a state of the state machine, and an abnormal operation when the interval of the control plane message of the analysis target mobile communication network is determined as the long latency message interval (LMI).

According to an exemplary embodiment, a method of diagnosing an abnormality of a mobile communication network includes 1) modeling a control plane operation of an analysis target mobile communication network based on a control plane messages collected by a preset Mobile Network Operator to a terminal in a formal model of a form of a state machine, 2) comparing and analyzing processing required times of a control plane operation in the modeled analysis target mobile communication network and a model of another mobile communication network previously generated in a same path, and 3) detecting an abnormal operation of the mobile communication network of the analysis target based on a comparison result.

The modeling may include 1) modeling an interaction operation of a protocol and the state machine by expressing state definition of a control plane protocol as a state based on the control plane messages, and 2) modeling a transition which is a set of sequentially listing the control plane messages due to a state change.

The analyzing may include 1) extracting a path and a processing time of control plane messages existing in the path from the control plane operation model of the analysis target mobile communication network and the control plane operation model of the other mobile communication network, and 2) comparing the extracted processing required times in the same path extracted from the control plane operation model of the analysis target mobile communication network and the control plane operation model of another mobile communication network.

The detecting may include determining an interval of the control plane message of the analysis target mobile communication network as a long latency message interval (LMI), where the processing required time of the control plane operation model of the analysis target mobile communication network is greater than the processing required time of the control plane operation model of the another mobile communication network in the same path.

The detecting may include detecting an occurrence condition of an abnormal operation for a network component that processes a control plane message in a corresponding path indicated by the same path, a path and a state of the state machine, and an abnormal operation when the interval of the control plane message of the analysis target mobile communication network is determined as the long latency message interval (LMI).

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1A:
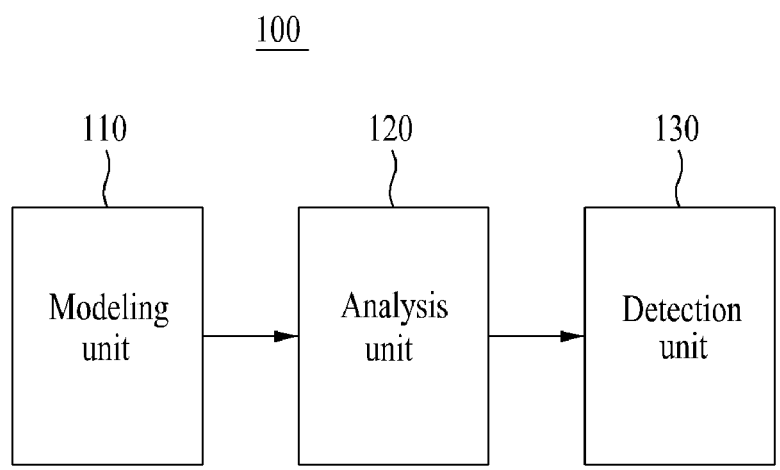
FIGS. 1A to 1C are block diagrams illustrating the detailed configuration of an apparatus for diagnosing an abnormality of a mobile communication network according to an embodiment of the inventive concept.

Hereinafter embodiments of the inventive concept will be described in detail with reference to the accompanying drawings. However, it should be understood that the inventive concept is not limited to the following embodiments. In addition, the same reference numerals used in each drawing represent the same elements.

In addition, terminologies used herein are defined to appropriately describe the exemplary embodiments of the inventive concept and thus may be changed depending on a viewer, the intent of an operator, or a custom. Accordingly, the terminologies must be defined based on the following overall description of this disclosure.

The gist of embodiments of the inventive concept is to diagnose an abnormal operation of a mobile communication network based on a control plane message that is collected by a preset Mobile Network Operator to a terminal by using operation modeling and comparative analysis.

The terminal is a device which is connected to a telephone network or an Internet network through a base station and a backhaul network and uses a voice call or a wireless network. For example, the terminal includes all smart devices, which are capable of using voice calls or wireless networks, such as smart phones, tablet PCs, and smart watches, and includes a notebook computer, a laptop, a PDA, and the like in addition to the smart devices. A terminal may connect a session with a telephone network or an internet network through a base station and a backhaul network and transmit and receive voice information or data with another device (for example, a portal server or another terminal), thereby using a voice call or a wireless network.

In addition, the terminal receives a control plane message on a variety of services (e.g., location confirmation, terminal authentication, telephone connection, radio resource connection, or the like) by using a voice call or a wireless network. The terminal receives a control plane message on various services from a Mobile Network Operator providing a voice call or a wireless network, and performs an operation or determination according to the received control plane message. Thereafter, the terminal transmits the operation result or the determination result according to the control plane message through the telephone network or Internet network, thereby allowing the Mobile Network Operator to identify the operation result or determination result of the terminal according to the transmission of the corresponding control plane message.

Further, the base station is present between the terminal and the backhaul network, and transfers voice information or data between the terminal and the telephone network or the Internet network. When the network is implemented as 3G mobile communication, the base station may be implemented as a NodeB, and when the network is implemented as 4G mobile communication, the base station may be implemented as an eNodeB.

The backhaul network connects the base station and the telephone network or the Internet network to allow data or control plane messages to be transmitted/received. The backhaul network may include various configurations according to the implementation form of the network. For example, when the network is implemented with 3G mobile communication, the backhaul network includes a mobile switching center (MSC), a serving GPRS support node (SGSN), a gateway GPRS support node (GGSN), and the like, and transmits and receives data plane data such as voice information or wireless network data and a control plane message between the Mobile Network Operator and the terminal through the telephone network or the Internet network. Meanwhile, when the network is implemented with 4G mobile communication, the backhaul network includes a mobility management entity (MME), a serving gateway (S-GW), a packet data network gateway (PGW), a home subscriber server (HSS), and the like. As described above, the backhaul network is implemented while including a configuration for transmitting and receiving data or control plane messages according to the form of implementing the network. Later, even if a new network (e.g., 5G mobile communication or a later generation mobile communication) emerges due to the development of the technology, the backhaul network may be implemented while including a configuration for transmitting and receiving data or control plane messages in the corresponding network.

An apparatus for diagnosing an abnormality of a mobile communication network according to an embodiment of the inventive concept is an apparatus for diagnosing whether an abnormality has occurred in a mobile communication network by receiving and analyzing a control plane message from a terminal.

An apparatus for diagnosing an abnormality of a mobile communication network according to an embodiment of the inventive concept will be described in more detail with reference to FIGS. 1A to 4.

Figure 1B:
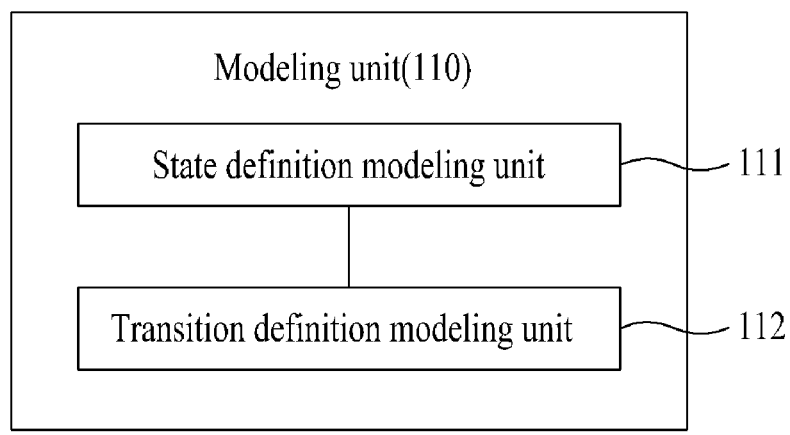
Figure 1C:
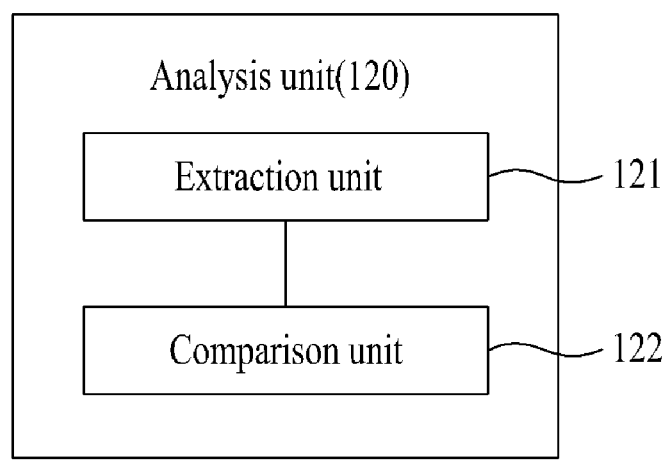

FIGS. 1A to 1C are block diagrams illustrating the detailed configuration of an apparatus for diagnosing an abnormality of a mobile communication network according to an embodiment of the inventive concept.

Referring to FIGS. 1A to 1C, an apparatus for diagnosing an abnormality of a mobile communication network according to an embodiment of the inventive concept diagnoses an abnormal operation of a mobile communication network by using operation modeling and comparative analysis.

To this end, an apparatus 100 for diagnosing an abnormality of a mobile communication network according to an embodiment of the inventive concept includes a modeling unit 110, an analysis unit 120, and a detection unit 130.

The modeling unit 110 models a control plane operation of an analysis target mobile communication network based on a control plane message, which is collected by a preset Mobile Network Operator (MNO) to a terminal, in a formal model of a form of a state machine.

In modeling the control plane procedure, the modeling unit 110 may model a sequence of control plane messages included in the control plane procedure or a time required for each procedure. For example, the modeling unit 110 may receive and model control plane procedure for various services provided by a plurality of communication companies. In addition, the modeling unit 110 may receive and analyze only a control plane message for a specific service, but embodiments are not necessarily limited thereto. The modeling unit 110 may receive and model control plane messages for various services provided by a plurality of communication companies as well as a specific service. For example, even when the apparatus 100 for diagnosing an abnormality of a mobile communication network is to determine whether an abnormality exists in a network when a terminal uses a service for call connection, the modeling unit 110 may not only perform the call connection, but also receive and analyze control plane messages for various services, such as location checking, radio resource connection, and the like.

When receiving and analyzing control plane messages for various services provided by a plurality of communication companies, the modeling unit 110 may repeatedly receive and model the control plane messages for the same service a plurality of times. For example, by repeatedly receiving and modeling the control plane message provided to the terminal for the same service for each Mobile Network Operator 1000 times, the control plane message for the corresponding service may be modeled in a formal model.

As described above, the modeling unit 110 receives the control plane messages transmitted and received between the mobile communication network of an analysis target and the terminal as input data, and generates a model in which the control plane operation of the mobile communication network of an analysis target is represented in the form of a state machine. In this case, the modeling unit 110 includes a state definition modeling unit 111 and a transition definition modeling unit 112 in order to model the control plane operation of the analysis target mobile communication network as a model in the form of a state machine.

The state machine may represent an operation of a control plane as a state and transition.

In this case, the state definition modeling unit 111 may express the state definition of the control plane protocol as one state based on the control plane message, and model an operation in which a plurality of protocols and a state machine interact with each other to provide an integrated view of the control plane operation.

In this case, the state may be represented by a combination of an EPS mobility management (EMM) state and an EPS session management (ESM) state defined in the 3GPP standard. The state definition modeling unit 111 may express state definitions individually defined and presented in the control plane protocols as one state, such that an actual operation of a mobile communication network in which a plurality of protocols and a state machines are mixed and interact with each other is modeled and the integrated view of the control plane operation is provided.

In addition, the transition definition modeling unit 112 may model a transition which is a set of sequentially arranging the control plane messages which are transmitted and received until a state change in which a current state changes to another state. In this case, the transition may represents a set of sequentially listing the control plane messages transmitted and received until one state changes to another state, and may indicate an operation scenario of the control plane procedure of the mobile communication network. Thus, when the transitions are the same, it means that the types and orders of the control plane messages generated at the start state and the end state and between them are the same.

A plurality of transitions between two types of states may exist in a state machine derived as the result of the modeling unit 110.

Figure 2:
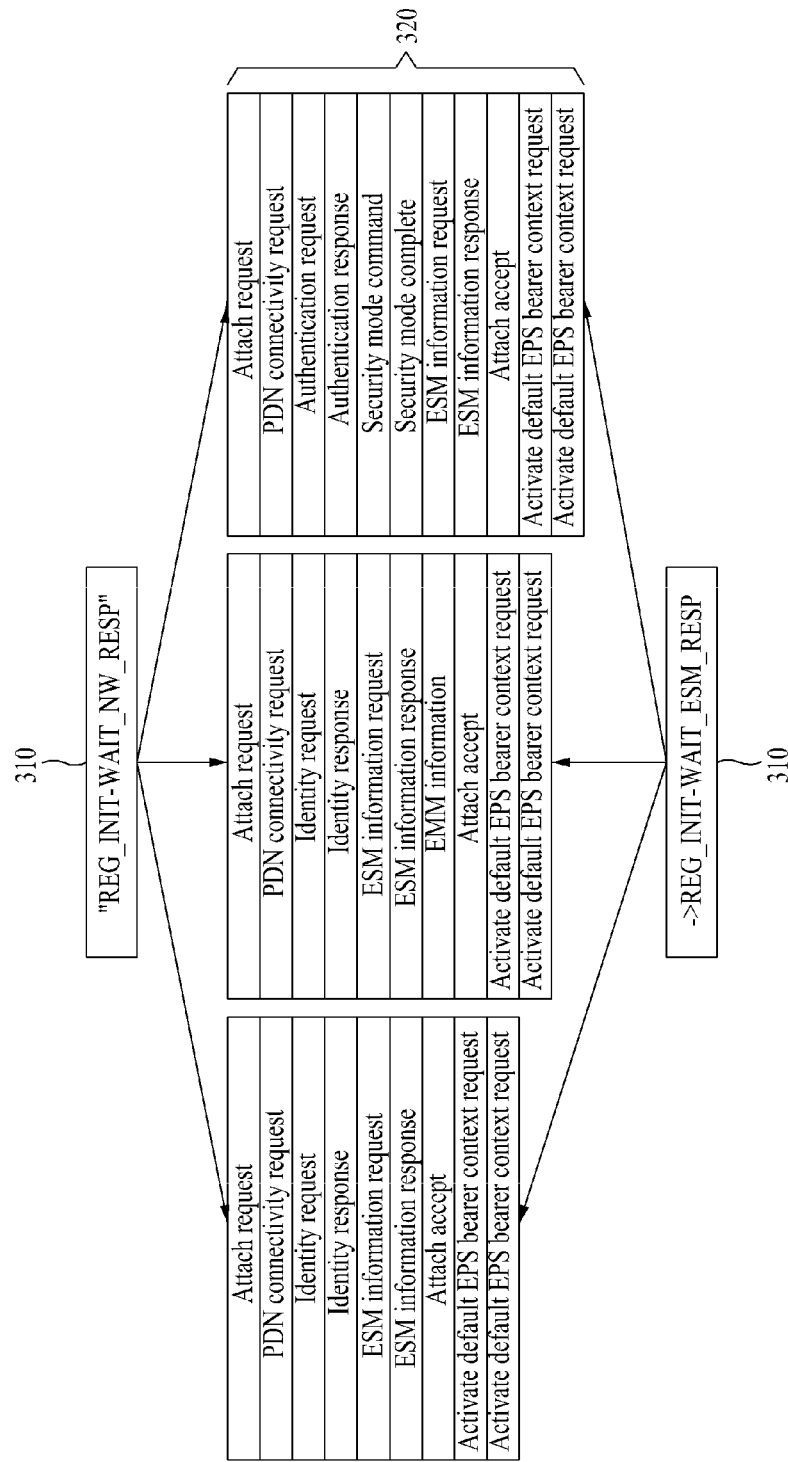
FIG. 2 is a view illustrating an example of a transition that exists between state changes according to an embodiment of the inventive concept.

Describing in more detail with reference to FIG. 2, a plurality of transitions 320 existing between two states 310 of "REG_INIT-WAIT_NW_RESP" and "REG_INIT-WAIT_ESM_RESP" mean performing the same control plane procedure. However, it may be possible to express it as a combination of various detailed procedures. Thus, each transition 320 may represent various operating scenarios of the control plane message procedure.

The modeling scheme proposed by the apparatus 100 for diagnosing an abnormality of a mobile communication network according to an embodiment of the inventive concept is not a modeling scheme through standard analysis, but a modeling scheme based on collected control plane messages, and has following three advantages.

First, even though it is expressed in the natural language of vast contents, it is possible to minimize the analysis effort of standard content required to convert to a standardized model.

Second, by performing the modeling based on the control plane messages actually transmitted and received, it is possible to model an operation including a unique operation scheme of an analysis target mobile communication network as well as a scheme of processing and operating for each service in an actual analysis target mobile communication network.

Third, by using the state definitions defined in the standard, it is possible to share the same state definition between the models, and then to enable comparison and analysis between the models.

Referring again to FIGS. 1A to 1C, the analysis unit 120 of the apparatus 100 of diagnosing an abnormality of a mobile communication network according to an embodiment of the inventive concept compares the processing required times of the control plane operation model of the modeled analysis target mobile communication network and the previously generated control plane operation model of another mobile communication network, in the same path.

In this case, the analysis unit 120 may include 1) an extraction unit 121 that extracts a path and a processing required times of the control plane messages existing in the path from the control plane operation model of the analysis target mobile communication network and the control plane operational model of the other mobile communication network, and 2) a comparison unit 122 that compares the extracted processing required times in the same path extracted from the control plane operation model of the analysis target mobile communication network and the control plane operation model of the another mobile communication network.

The extraction unit 121 may extract a path that is a set of transitions from a source state to a sink state in each of the control plane operation model of the analysis target mobile communication network and the control plane operation model of the another mobile communication network, and extract the processing required time of the control plane messages existing in the extracted path.

Figure 3:
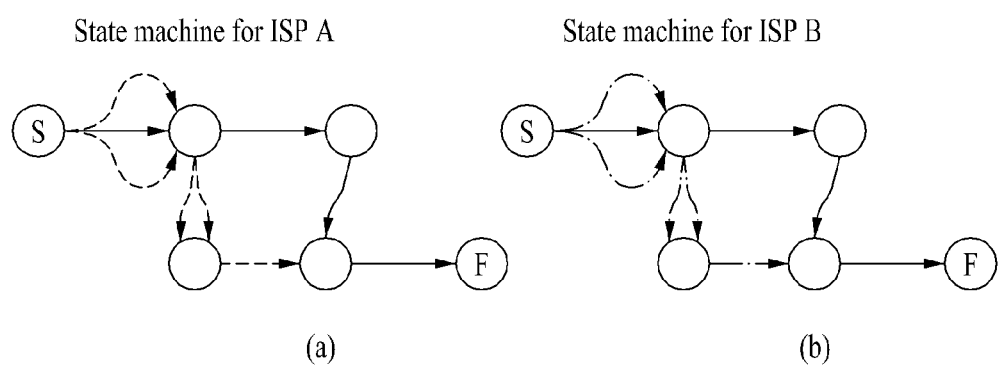
FIG. 3 is a view illustrating an example of a state machine according to an embodiment of the inventive concept.

Describing in more detail with reference to FIG. 3, the extraction unit 121 may perform the following process for the path extraction in the state machine.

First, the extraction unit 121 may select the source state S and the sink state F among several states constituting the state machine. According to an embodiment, although the start state (or source state) S and the end state F may be arbitrarily selected. When it is desired to specify the procedure and service to be analyzed and compare the two models (ISP A and ISP B in FIG. 3), the source state S and the end state F of the corresponding procedure and service may be defined for use.

Second, the extraction unit 121 may extract a path that is a set of transitions from the start state S to the end state F.

In some cases, the path may consist of one or more transitions. When the start state S and the end state F do not reach through one transition, the path consists of a plurality of transitions. In addition, as shown by a dotted line in FIG. 3, even when a failure occurs during the execution of the procedure, the procedure reaches the target end state F through a plurality of transitions, so that the path may consist of a plurality of transitions. Accordingly, each path means scenarios until the target procedure is successfully performed, and also includes a failure recovery logic scenario, as shown by solid line in FIG. 3.

Referring to FIG. 3, the same paths may exist in the state machine of another MNO's mobile communication network (e.g., ISP B) as well as the analysis target mobile communication network (e.g., ISP A), and the extraction unit 121 may identify and extract the same path. In this case, it may be determined that the two paths are the same when the order and contents of the transitions constituting each path are the same.

In addition, the extraction unit 121 may calculate processing time for each message section existing in the path, for the extracted identical paths.

Next, referring to FIGS. 1A to 1C, the comparison unit 122 of the analysis unit 120 according to an embodiment of the inventive concept may compare processing required times of respectively extracted control plane messages, in the same path where the control plane operation model (e.g., ISP A) of an analysis target mobile communication network and the control plane operation model (e.g., ISP B) of another mobile communication network represent the order and contents of the same transition. The detection unit 130 detects an abnormal operation of the analysis target mobile communication network based on the comparison result.

For example, when the processing required time of the control plane operation model of the analysis target mobile communication network is greater than the processing required time of the control plane operation model of the another mobile communication network in the same path, the detection unit 130 may determine an interval of the control plane message of the analysis target mobile communication network as a long latency message interval (LMI). Therefore, the detection unit 130 may detect a network component that processes a control plane message in a corresponding path indicated by the path, a path of the state machine, and an occurrence condition of an abnormal operation when the interval of the control plane message of the analysis target mobile communication network is determined as the long latency message interval (LMI).

That is, the detection unit 130 may extract the long latency message intervals longer than the processing required time of the message interval existing in the same path in at least one model, and, through the long latency message interval, the unit may specify the circumstance and cause of the problem at the network component that processes the message in the path.

The apparatus 100 for diagnosing an abnormality of a mobile communication network according to an embodiment of the inventive concept performs the comparison for the same operation flow caused in two models on the same path to select an accurate comparison target, so that the comparison is possible by classifying various possible scenarios. In addition, when performing an analysis operation of the detected long latency message interval, the state and transition information constituting a path in which the long latency message interval exists may specify an occurrence condition of an long latency message interval in which a problem occurs from the path and state information on a network component and a state machine that processes each message, and specify a situation and a cause.

Figure 4:
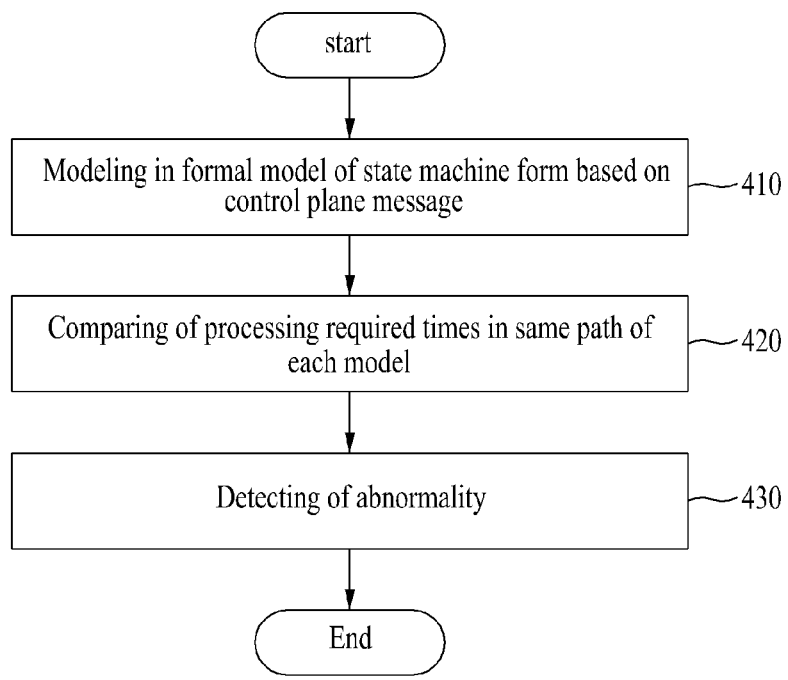
FIG. 4 is a flowchart illustrating a method of diagnosing an abnormity of a mobile communication network according to an embodiment of the inventive concept.

FIG. 4 is a flowchart illustrating a method of diagnosing an abnormity of a mobile communication network according to an embodiment of the inventive concept.

The method of FIG. 4 may be performed by the apparatus for diagnosing an abnormality of a mobile communication network according to an embodiment of the inventive concept illustrated in FIGS. 1A to 1C.

Referring to FIG. 4, in operation 410, the control plane operation of an analysis target mobile communication network is modeled based on a control plane message, which is collected by a preset Mobile Network Operator to a terminal, in a formal model of a form of a state machine.

The operation 410 may include 1) an operation (not shown) of modeling a protocol and an interaction operation of the state machine by expressing state definition of a control plane protocol as a state based on the control plane message, and 2) an operation (not shown) of modeling a transition which is a set of sequentially listing the control plane messages due to a state change.

The operation of modeling the protocol and the interaction operation between the state machines may express the state definition of the control plane protocols as one state based on the control plane message. It may also provide an integrated view of the control plane operation by modeling an operation in which a plurality of protocols and a state machine interact with each other.

In this case, the state may be represented by a combination of an EPS mobility management (EMM) state and an EPS session management (ESM) state defined in the 3GPP standard. The operation of modeling the protocol and the interaction operation of the state machine may express state definitions individually defined and presented in the control plane protocols as one state, such that an actual operation of a mobile communication network in which a plurality of protocols and a state machine are mixed and interact with each other is modeled and the integrated view of the control plane operation is provided.

The operation of modeling the transition may model a transition which is a set of sequentially arranging the control plane messages which are transmitted and received until a state change in which a current state changes to another state.

In this case, the transition may represent a set of sequentially arranging the control plane messages transmitted and received until one state changes to another state, and may indicate an operation scenario of the control plane procedure of the mobile communication network. Thus, when the transitions are the same, it means that the types and orders of the control plane messages generated at the start state and the end state and between them are the same.

In operation 420, the processing required times of a control plane operation model of the modeled analysis target mobile communication network and a control plane operation model of another mobile communication network previously generated in the same path are compared and analyzed.

The operation 420 may include an operation (not shown) of extracting a path and a processing time of control plane messages existing in the path from the control plane operation model of the analysis target mobile communication network and the control plane operation model of the other mobile communication network, and an operation (not shown) of comparing the extracted processing required times in the same path extracted from the control plane operation model of the analysis target mobile communication network and the control plane operation model of the another mobile communication network.

The operation of extracting the path and the processing time may extract a path that is a set of transitions from a source state to a sink state in each of the control plane operation model of the analysis target mobile communication network and the control plane operation model of the another mobile communication network, and extract the processing required time of the control plane messages existing in the extracted path.

The operation of comparing the processing required times may compare the extracted processing required times of the control plane messages, which are extracted by the control plane operation model of the analysis target mobile communication network and the control plane operation model of the another mobile communication network, in the same path representing a sequence and content of a same transition.

In operation 430, an abnormal operation of the mobile communication network of the analysis target is detected based on a comparison result For example, when the processing required time of the control plane operation model of the analysis target mobile communication network is greater than the processing required time of the control plane operation model of the another mobile communication network in the same path, the operation 430 may determine the interval of the control plane message of the analysis target mobile communication network as the long latency message interval (LMI). Therefore, when the interval of the control plane message of the analysis target mobile communication network is determined as the long latency message interval (LMI), the operation 430 may detect the network component that processes a control plane message in a corresponding path indicated by the same path, a path of the state machine, and the occurrence condition of an abnormal operation.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable gate array (FPGA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this invention provided they come within the scope of the appended claims and their equivalents.

According to the embodiments of the inventive concept, the cost required for standard analysis can be eliminated by using the control plane operation modeling of an automated mobile communication network, and the formal model to which a scheme is actually operated in the network which is operated by each mobile communication operator is applied may be created, so that the embodiment may be utilized in various systems of analyzing a control plane operation of a mobile communication network.

In addition, according to the embodiments of the inventive concept, by proposing a technology capable of quantitative evaluation through comparison between control plane operation models of mobile communication networks, it is possible to easily detect different abnormal operations for each operator and to quickly and accurately determine the cause of occurrence.

In addition, according to the embodiments of the inventive concept, the embodiments may be utilized as a technology for measuring and analyzing the effects of the introduction of new network equipment and the application of the technology as well as the detection and analysis of abnormal conditions, and the embodiment may be utilized as a verification and analysis technology in the mobile network-related market, including mobile network operators, equipment manufacturers and terminal manufacturers.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The embodiments of the invention in which an exclusive property or privilege is claimed are defined as follows:

1. An apparatus for diagnosing an abnormality of a mobile communication network, the apparatus comprising:
   a modeling unit configured to model a control plane operation of an analysis target mobile communication network based on the control plane messages collected by a preset Mobile Network Operator to a terminal in a formal model of a form of a state machine;
   an analysis unit configured to compare processing required times of a control plane operation model of the modeled analysis target mobile communication network and a control plane operation model of another mobile communication network previously generated in a same path; and
   a detection unit configured to detect an abnormal operation of the mobile communication network of the analysis target based on the comparison result, wherein the detection unit is configured to determine an interval of the control plane message of the analysis target mobile communication network as a long latency message interval (LMI) when the processing required time of the control plane operation model of the analysis target mobile communication network is greater than the processing required time of the control plane operation model of another mobile communication network in the same path.

2. The apparatus of claim 1, wherein the modeling unit includes:
a state definition modeling unit configured to model an interaction operation of a protocol and the state machine by expressing state definition of a control plane protocol as a state based on the control plane message; and
a transition definition modeling unit configured to model a transition which is a set of sequentially listing the control plane messages due to a state change.

3. The apparatus of claim 2, wherein the state definition modeling unit is configured to represent the state definition of the multiple control plane protocols as one state, and model an operation in which a plurality of protocols and the state machine interact with each other to provide an integrated view of the control plane operation.

4. The apparatus of claim 2, wherein the transition definition modeling unit is configured to model the transition by sequentially listing the control plane messages transmitted and received until the state change in which a current state is changed to another state, and
wherein the transition represents an operational scenario of a control plane procedure of the mobile communication network.

5. The apparatus of claim 1, wherein the analysis unit includes:
an extraction unit configured to extract a path and a processing time of control plane messages existing in the path from the control plane operation model of the analysis target mobile communication network and the control plane operation model of the other mobile communication network; and
a comparison unit configured to compare the extracted processing required times in the same path extracted from the control plane operation model of the analysis target mobile communication network and the control plane operation model of the another mobile communication network.

6. The apparatus of claim 5, wherein the extraction unit is configured to extract a path that is a set of transitions from a source state to a sink state in each of the control plane operation model of the analysis target mobile communication network and the control plane operation model of the another mobile communication network, and extract the processing required time of the control plane messages existing in the extracted path.

7. The apparatus of claim 6, wherein the comparison unit is configured to compare the processing required times of the control plane messages, which are extracted by the control plane operation model of the analysis target mobile communication network and the control plane operation model of the another mobile communication network, in the same path representing a sequence and content of a same transition.

8. The apparatus of claim 1, wherein the detection unit is configured to detect an occurrence condition of an abnormal operation for a network component that processes the control plane message in a corresponding path indicated by the same path, a path and a state of the state machine, and an abnormal operation when the interval of the control plane message of the analysis target mobile communication network is determined as the long latency message interval (LMI).

9. A method of diagnosing an abnormality of a mobile communication network, the method comprising:
modeling a control plane operation of an analysis target mobile communication network based on a control plane message collected by a preset Mobile Network Operator to a terminal in a formal model of a form of a state machine;
comparing and analyzing processing required times of a control plane operation model of the modeled analysis target mobile communication network and a control plane operation model of another mobile communication network previously generated in a same path; and
detecting an abnormal operation of the mobile communication network of the analysis target based on a comparison result, wherein the detecting includes determining an interval of the control plane message of the analysis target mobile communication network as a long latency message interval (LMI) when the processing required time of the control plane operation model of the analysis target mobile communication network is greater than the processing required time of the control plane operation model of the another mobile communication network in the same path.

10. The method of claim 9, wherein the modeling includes:
modeling an interaction operation of a protocol and the state machine by expressing state definition of a control plane protocol as a state based on the control plane message; and
modeling a transition which is a set of sequentially listing the control plane messages due to a state change.

11. The method of claim 9, wherein the analyzing includes:
extracting a path and a processing time of control plane messages existing in the path from the control plane operation model of the analysis target mobile communication network and the control plane operation model of the other mobile communication network; and
comparing the extracted processing required times in the same path extracted from the control plane operation model of the analysis target mobile communication network and the control plane operation model of the another mobile communication network.

12. The method of claim 9, wherein the detecting includes:
detecting an occurrence condition of an abnormal operation for a network component that processes a control plane message in a corresponding path indicated by the same path, a path and a state of the state machine, and an abnormal operation when the interval of the control plane message of the analysis target mobile communication network is determined as the long latency message interval (LMI).

13. An apparatus for diagnosing an abnormality of a mobile communication network, the apparatus comprising:
a modeling unit configured to model a control plane operation of an analysis target mobile communication network based on the control plane messages collected by a preset Mobile Network Operator to a terminal in a formal model of a form of a state machine;
an analysis unit configured to compare processing required times of a control plane operation model of the modeled analysis target mobile communication network and a control plane operation model of another mobile communication network previously generated in a same path, wherein the analysis unit includes:
an extraction unit configured to extract a path and a processing time of control plane messages existing in the path from the control plane operation model of the analysis target mobile communication network and the control plane operation model of the other mobile communication network, wherein the extraction unit is configured to extract a path that is a set of transitions from a source state to a sink state in each of the control plane operation model of the analysis target mobile communication network and the control plane operation model of the another mobile communication network, and extract the processing required time of the control plane messages existing in the extracted path; and
a comparison unit configured to compare the extracted processing required times in the same path extracted from the control plane operation model of the analysis target mobile communication network and the control plane operation model of the another mobile communication network; and
a detection unit configured to detect an abnormal operation of the mobile communication network of the analysis target based on the comparison result.

14. The apparatus of claim 13, wherein the modeling unit includes:
a state definition modeling unit configured to model an interaction operation of a protocol and the state machine by expressing state definition of a control plane protocol as a state based on the control plane message; and
a transition definition modeling unit configured to model a transition which is a set of sequentially listing the control plane messages due to a state change.

15. The apparatus of claim 14, wherein the state definition modeling unit is configured to represent the state definition of the multiple control plane protocols as one state, and model an operation in which a plurality of protocols and the state machine interact with each other to provide an integrated view of the control plane operation.

16. The apparatus of claim 14, wherein the transition definition modeling unit is configured to model the transition by sequentially listing the control plane messages transmitted and received until the state change in which a current state is changed to another state, and
wherein the transition represents an operational scenario of a control plane procedure of the mobile communication network.

17. The apparatus of claim 13, wherein the comparison unit is configured to compare the processing required times of the control plane messages, which are extracted by the control plane operation model of the analysis target mobile communication network and the control plane operation model of the another mobile communication network, in the same path representing a sequence and content of a same transition.

\* \* \* \* \*